(12) United States Patent
Zhang et al.

(10) Patent No.: US 11,449,096 B2
(45) Date of Patent: Sep. 20, 2022

(54) FOLDABLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Zhuo Zhang, Wuhan (CN); Guobao Jiang, Wuhan (CN); Zikang Feng, Wuhan (CN)

(73) Assignee: Wuhan China Star Optoelectronics Semiconductor Display Technology Co., LTD., Hubei (CN)

( * ) Notice: Subject to any disclaimer, the term of this patent is extended or adjusted under 35 U.S.C. 154(b) by 25 days.

(21) Appl. No.: 17/251,759

(22) PCT Filed: Jun. 24, 2020

(86) PCT No.: PCT/CN2020/098058
§ 371 (c)(1),
(2) Date: Dec. 11, 2020

(87) PCT Pub. No.: WO2021/237850
PCT Pub. Date: Dec. 2, 2021

(65) Prior Publication Data
US 2021/0405692 A1    Dec. 30, 2021

(30) Foreign Application Priority Data

May 27, 2020  (CN) .......................... 202010463198.2

(51) Int. Cl.
*G06F 1/16*     (2006.01)

(52) U.S. Cl.
CPC .......... *G06F 1/1616* (2013.01); *G06F 1/1652* (2013.01); *G06F 1/1673* (2013.01); *G06F 1/1681* (2013.01)

(58) Field of Classification Search
CPC .... G06F 1/1616; G06F 1/1652; G06F 1/1671; G06F 1/1673; G06F 1/1681
See application file for complete search history.

(56) References Cited

U.S. PATENT DOCUMENTS

| 10,739,826 B1* | 8/2020 | Knoppert | G06F 1/166 |
| 2018/0210508 A1* | 7/2018 | Aurongzeb | G06F 1/1641 |
| 2019/0121399 A1* | 4/2019 | Ku | G06F 1/1677 |
| 2020/0233465 A1* | 7/2020 | Li | G06F 1/1669 |

(Continued)

FOREIGN PATENT DOCUMENTS

| CN | 102236469 A | 11/2011 |
| CN | 103576864 A | 2/2014 |

(Continued)

*Primary Examiner* — Anthony Q Edwards
(74) *Attorney, Agent, or Firm* — PV IP PC; Wei Te Chung; Ude Lu

(57) ABSTRACT

A foldable display device is provided, which includes a foldable body, a flexible display panel, and a keyboard film. The keyboard film is housed on one side of the foldable body when not in use, and it can be flipped to one side of the flexible display panel away from the foldable body to match a virtual keyboard area to realize a function of simulating a feel of an external physical keyboard. Therefore, work efficiency of the foldable display device in a notebook mode as well as portability are improved.

20 Claims, 9 Drawing Sheets

(56) References Cited

U.S. PATENT DOCUMENTS

2020/0319674 A1* 10/2020 Knoppert .............. G06F 1/1632
2022/0039273 A1* 2/2022 Zhang ................... G06F 1/1652
2022/0116489 A1* 4/2022 Nagai ..................... F16C 11/04
2022/0147111 A1* 5/2022 Zou ....................... G06F 1/1616

FOREIGN PATENT DOCUMENTS

| CN | 203930589 U | 11/2014 |
|----|-------------|---------|
| CN | 209232312 U | 8/2019 |
| CN | 110896416 A | 3/2020 |
| CN | 212276301 U | 1/2021 |
| JP | 2012243153 A | 12/2012 |

* cited by examiner

FOLDABLE DISPLAY DEVICE

RELATED APPLICATIONS

This application is a Notional Phase of PCT Patent Application No. PCT/CN2020/098058 having international filing date of Jun. 24, 2020, which claims the benefit of priority of Chinese Patent Application No. 202010463198.2 filed on May 27, 2020. The contents of the above applications are all incorporated by reference as if fully set forth herein in their entirety.

FIELD OF INVENTION

The present invention relates to the field of display technology, in particular to a foldable display device.

BACKGROUND OF INVENTION

With advancements made in display technology, consumers' demands for display panels have become more diverse and personalized. Foldable display devices have advantages such as foldability and portability, and therefore are favored by consumers.

Technical Problem

Current foldable display devices can achieve multiple usage experiences of mobile phone, tablet, and laptop by cooperating with an external entire physical keyboard. However, such a manner of connecting the external physical keyboard is complicated, and it is inconvenient to carry. Therefore, it is necessary to provide a foldable display device to solve this disadvantage.

SUMMARY OF INVENTION

Embodiments of the disclosure provide a foldable display device to solve the problem that the connection manner of the external physical keyboard used in the current foldable display device is complicated and is inconvenient to carry.

The embodiments of the disclosure provide a foldable display device which can be transformed into a notebook mode and a tablet mode, the foldable display device includes: a foldable body enabling the foldable display device in a folded state, a half-folded state, and an unfolded state; a flexible display panel disposed on the foldable body and including a display area, the display area including a virtual keyboard area configured to display a virtual keyboard; and a keyboard film connected to one end of the foldable body, the keyboard film provided with a plurality of raised keys corresponding to key positions of the virtual keyboard in one-to-one correspondence, wherein the keyboard film is housed on one side of the foldable body away from the flexible display panel when not in use, the keyboard film is flipped to one side of the flexible display panel away from the foldable body when in use to match the virtual keyboard area to realize a function of simulating a feel of an external physical keyboard.

According to an embodiment of the present disclosure, each of the keys is a hollow structure, an inner surface of each of the keys is provided with a transparent conductive film; when the keys are pressed and thus recessed, the transparent conductive film therein contacts a surface of the flexible display panel.

According to an embodiment of the disclosure, material of the keyboard film includes transparent elastic rubber or transparent elastic silicone.

According to an embodiment of the disclosure, the display area further includes a first display area and a second display area, the second display area is positioned between the first display area and the virtual keyboard area, the foldable body includes: a first hinge, a second hinge; a first body, a second body, and a third body respectively corresponding to the first display area, the second display area, and the virtual keyboard area; the first body and the second body are connected by the first hinge, and the second body and the third body are connected by the second hinge.

According to an embodiment of the disclosure, the keyboard film is fixedly connected or rotatably connected to one side of the third body away from the second body, one side of the third body away from the flexible display panel is provided with an accommodating cavity, and the keyboard film is housed in the accommodating cavity when not in use.

According to an embodiment of the disclosure, when the foldable display device is in the tablet mode, the foldable display device is in the unfolded state, and the first display area, the second display area, and the virtual keyboard area are positioned in same plane to enable a coplanar display.

According to an embodiment of the disclosure, when the foldable display device is in the notebook mode, the foldable display device is in the half-folded state, the first display area and the second display area are positioned in same plane and stand on a plane where the third body is positioned through the second hinge to enable a coplanar display, the virtual keyboard area displays the virtual keyboard and the keyboard film is flipped to one side of the flexible display panel away from the foldable body to match the virtual keyboard area.

According to an embodiment of the disclosure, a whole body formed by the second display area and the virtual keyboard area is symmetrical to the first display area with respect to the first hinge, and the second display area and the virtual keyboard area are symmetrical with respect to the second hinge.

According to an embodiment of the disclosure, a bracket is disposed on one side of the second body away from the flexible display panel; when the foldable display device is in the notebook mode, the bracket is unfolded and abuts against the plane where the third body is positioned, and when the foldable display device is in the tablet mode, the bracket is housed on one side of the second body away from the flexible display panel.

According to an embodiment of the disclosure, a bracket is disposed on one side of the second body away from the flexible display panel; when the foldable display device is in the notebook mode, the bracket is unfolded and abuts against the plane where the third body is positioned, and when the foldable display device is in the tablet mode, the bracket is housed on one side of the second body away from the flexible display panel.

According to an embodiment of the disclosure, the bracket is rotatably connected to one side of the second body close to the first body through a rotating shaft, a torsion spring is disposed on the rotating shaft, and torsion arms on both sides of the torsion spring are respectively fixed on the bracket and the second body, and one side of the second body close to the third body is provided with a sliding buckle configured to fix the bracket.

An embodiment of the disclosure also provides a foldable display device, which can be transformed into a notebook mode and a tablet mode, the foldable display device including: a foldable body enabling the foldable display device in a folded state, a half-folded state, and an unfolded state; a flexible display panel disposed on the foldable body and including a display area, the display area including a virtual keyboard area configured to display a virtual keyboard; and a keyboard film connected to one end of the foldable body and material of the keyboard film being a transparent elastic rubber, the keyboard film provided with a plurality of raised keys corresponding to key positions of the virtual keyboard in one-to-one correspondence; wherein each of the keys is a hollow structure, an inner surface of each of the keys is provided with a transparent conductive film, the keyboard film is housed on one side of the foldable body away from the flexible display panel when not in use, the keyboard film is flipped to one side of the flexible display panel away from the foldable body when in use to match the virtual keyboard area. When the keys are pressed and thus recessed, the transparent conductive film therein contacts a surface of the flexible display panel to realize a function of simulating a feel of an external physical keyboard.

According to an embodiment of the disclosure, the display area further includes a first display area and a second display area, the second display area is positioned between the first display area and the virtual keyboard area, the foldable body includes: a first hinge, a second hinge; a first body, a second body, and a third body respectively corresponding to the first display area, the second display area, and the virtual keyboard area; the first body and the second body are connected by the first hinge, and the second body and the third body are connected by the second hinge.

According to an embodiment of the disclosure, the keyboard film is fixedly connected or rotatably connected to one side of the third body away from the second body, one side of the third body away from the flexible display panel is provided with an accommodating cavity, and the keyboard film is housed in the accommodating cavity when not in use.

According to an embodiment of the disclosure, when the foldable display device is in the tablet mode, the foldable body is in the unfolded state, and the first display area, the second display area, and the virtual keyboard area are positioned in same plane to enable a coplanar display.

According to an embodiment of the disclosure, when the foldable display device is in the notebook mode, the foldable display device is in the half-folded state, the first display area and the second display area are positioned in same plane and stand on a plane where the third body is positioned through the second hinge to enable a coplanar display, the virtual keyboard area displays the virtual keyboard and the keyboard film is flipped to one side of the flexible display panel away from the foldable body to match the virtual keyboard area.

According to an embodiment of the disclosure, a whole body formed by the second display area and the virtual keyboard area is symmetrical to the first display area with respect to the first hinge, and the second display area and the virtual keyboard area are symmetrical with respect to the second hinge.

According to an embodiment of the disclosure, a bracket is disposed on one side of the second body away from the flexible display panel; when the foldable display device is in the notebook mode, the bracket is unfolded and abuts against the plane where the third body is positioned, and when the foldable display device is in the tablet mode, the bracket is housed on one side of the second body away from the flexible display panel.

According to an embodiment of the disclosure, the bracket is rotatably connected to one side of the second body close to the first body through a rotating shaft, a torsion spring is disposed on the rotating shaft, and torsion arms on both sides of the torsion spring are respectively fixed on the bracket and the second body, and one side of the second body close to the third body is provided with a sliding buckle configured to fix the bracket.

An embodiment of the disclosure also provides a foldable display device, which can be transformed into a notebook mode and a tablet mode, the foldable display device including: a foldable body enabling the foldable display device in a folded state, a half-folded state, and an unfolded state, the foldable body including a first hinge, a second hinge, a first body, a second body, and a third body, the first body and the second body are connected by the first hinge, and the second body and the third body are connected by the second hinge; a flexible display panel disposed on the foldable body and including a first display area, a second display area, and a virtual keyboard area configured to display a virtual keyboard, the second display area positioned between the first display area and the virtual keyboard area; and a keyboard film connected to one side of the third body away from the second body, the keyboard film made of transparent elastic rubber material, the keyboard film provided with a plurality of raised keys corresponding to key positions of the virtual keyboard in one-to-one correspondence; wherein each of the keys is a hollow structure, an inner surface of each of the keys is provided with a transparent conductive film, the keyboard film is housed on one side of the foldable body away from the flexible display panel when not in use, the keyboard film is flipped to one side of the flexible display panel away from the foldable body when in use to match the virtual keyboard area; when the keys are pressed and thus recessed, the transparent conductive film therein contacts a surface of the flexible display panel to realize a function of simulating a feel of an external physical keyboard.

According to an embodiment of the disclosure, a whole body formed by the second display area and the virtual keyboard area is symmetrical to the first display area with respect to the first hinge, and the second display area and the virtual keyboard area are symmetrical with respect to the second hinge.

Beneficial Effect

In the disclosed embodiment, a keyboard film is connected to one side of the foldable body and is provided with raised keys, each of the keys corresponds to a key position of the virtual keyboard in one-to-one correspondence. The keyboard film can be housed on one side of the foldable body away from the flexible display panel when not in use, so it does not affect a normal use of the foldable display device in the tablet mode. When the keyboard film is used, it can be flipped to one side of the flexible display panel away from the foldable body to match the virtual keyboard area of the flexible display panel to realize a function of simulating a feel of an external physical keyboard. Therefore, work efficiency in the notebook mode of the foldable display device and its portability are improved.

DESCRIPTION OF DRAWINGS

In order to explain the embodiments, or the technical solutions of the prior art more clearly, the following will briefly introduce the drawings that need to be used in the description of the embodiments or the prior art. Obviously, the drawings in the following description are only some of the disclosed embodiments. For those of ordinary skill in the art, other drawings can be obtained based on these drawings without paying creative work.

DETAILED DESCRIPTION OF PREFERRED EMBODIMENTS

Figure 1:
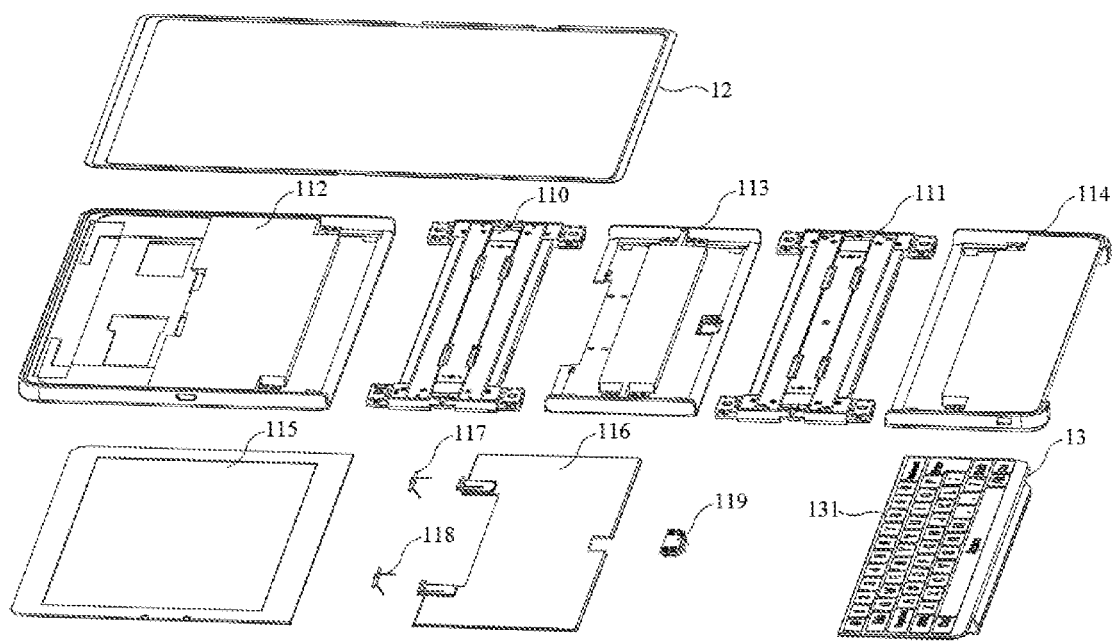
FIG. 1 is an exploded schematic diagram of a foldable display device provided by an embodiment of the disclosure.

The description of the following embodiments refers to the drawings to illustrate specific embodiments that the present disclosure can be implemented. The directional terms mentioned in this disclosure, such as "above", "below", "front", "rear", "left", "right", "inside", "outside", "side", etc., only refer to the direction of the drawings. Therefore, the directional terms are used to illustrate and understand the present disclosure, rather than to limit the disclosure. In the drawings, units with similar structures are indicated by the same reference numerals.

The disclosure will be further described below with reference to the drawings and specific embodiments:

Embodiments of the present disclosure provide a foldable display device, which will be described in detail below with reference to FIG. 1 to FIG. 10.

Figure 2:
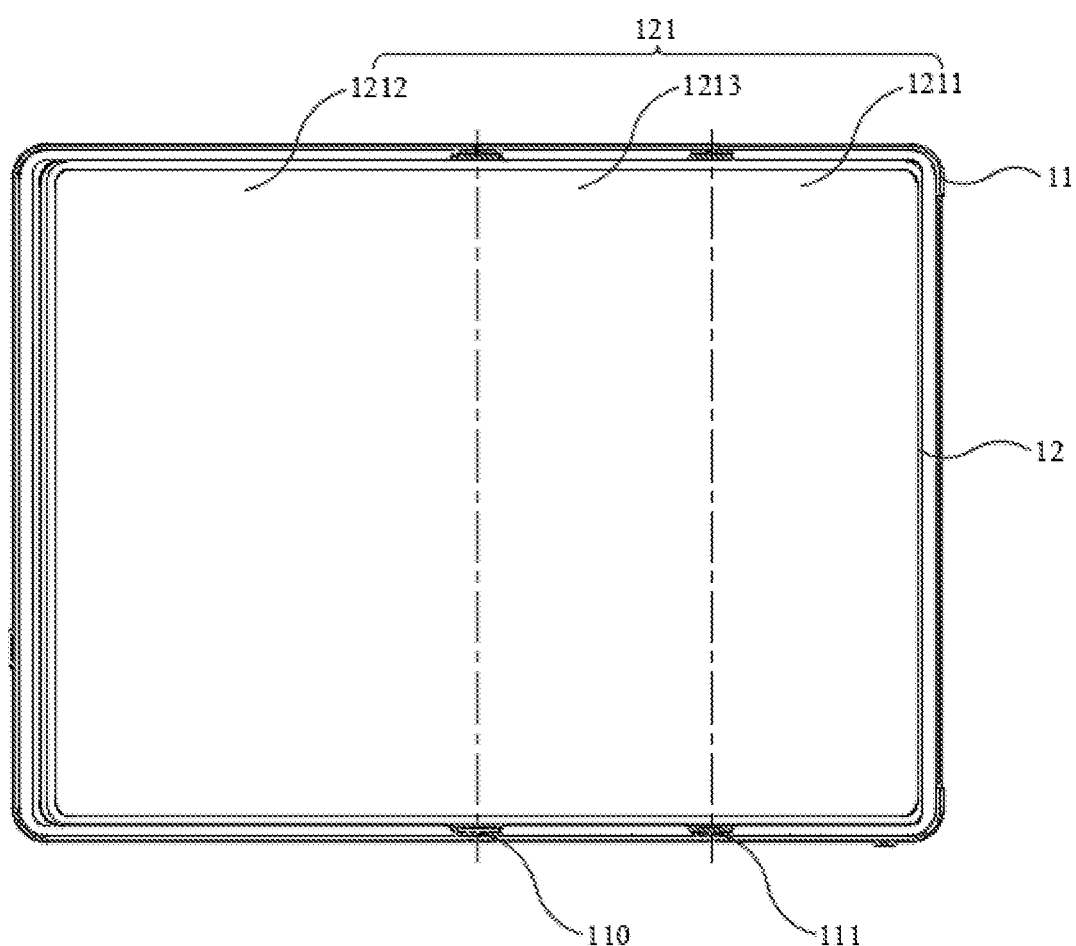
FIG. 2 is a schematic diagram of a front structure of the foldable display device in an unfolded state provided by an embodiment of the disclosure.
Figure 3:
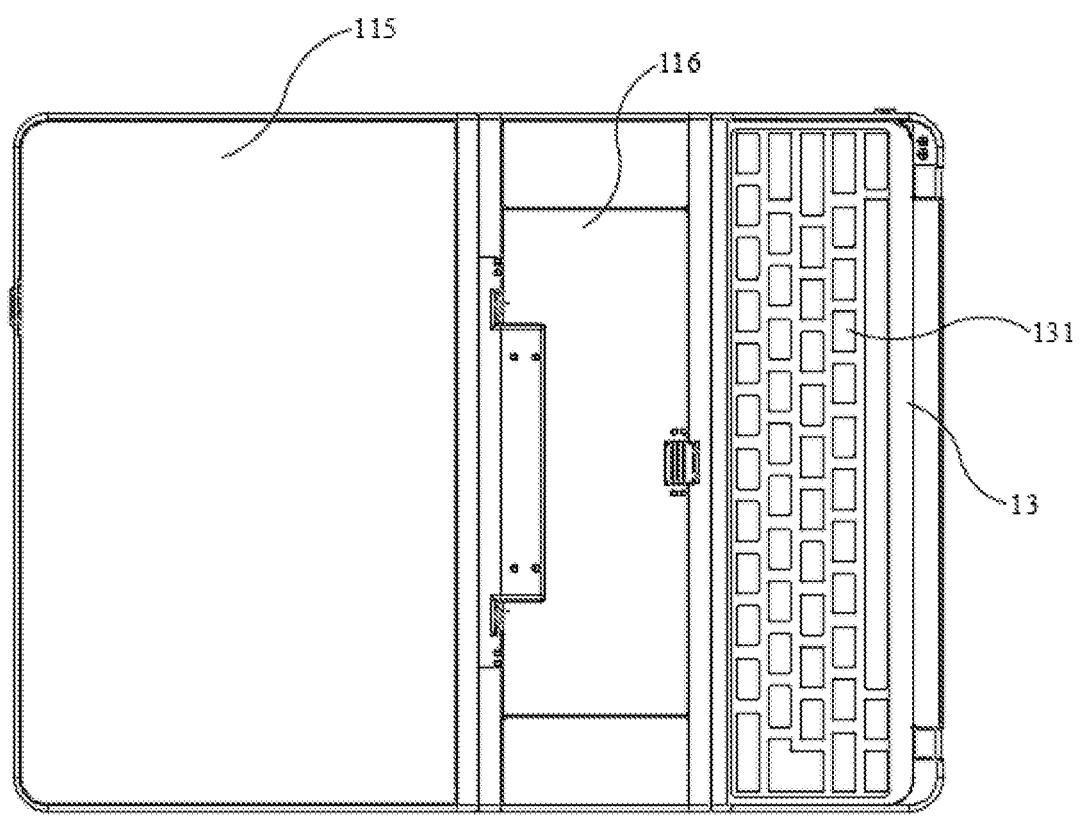
FIG. 3 is a schematic diagram of a rear structure of the foldable display device in the unfolded state provided by an embodiment of the disclosure.

Refer to FIG. 1 to FIG. 3, wherein FIG. 1 is an exploded schematic diagram of a foldable display device provided by an embodiment of the present disclosure. FIG. 2 is a schematic diagram of a front structure of the foldable display device in an unfolded state provided by an embodiment of the disclosure. FIG. 3 is a schematic diagram of a rear structure of the foldable display device in the unfolded state provided by an embodiment of the disclosure. The foldable display device provided by the embodiment of the disclosure includes: a foldable body 11 that enables the foldable display device to be switched in a folded state, a half-folded state, and an unfolded state, a flexible display panel 12 for screen display, and a keyboard film 13 to simulate a feel of an external physical keyboard.

The flexible display panel 12 can adopt a flexible organic light-emitting diode display panel in the prior art, which can be folded or unfolded under an action of the foldable body 11. The flexible display panel 12 includes a display area 121 and a non-display area positioned around the display area 121. The display area 121 includes a virtual keyboard area 1211 configured to display a virtual keyboard (not shown). When the virtual keyboard area 1211 is not displaying the virtual keyboard, it is together with other display areas to enable a coplanar display.

The keyboard film 13 is provided with a plurality of raised keys 131, each corresponding to a key position of the virtual keyboard in one-to-one correspondence. The virtual keyboard is connected to one end of the foldable body 11 and can be flipped relative to the foldable body 11. When the keyboard film 13 is used, it can be flipped to one side of the flexible display panel 12 away from the foldable body 11 to match the virtual keyboard area 1211. When the key 131 is pressed, it contacts a surface of the flexible display panel 12 where a key position of the virtual keyboard corresponding to the keys 131 is located, thereby achieving the pressing of key positions of the virtual keyboard. Therefore, the function of an external physical keyboard can be realized through the cooperation of the keyboard film 13 and the virtual keyboard without using an external physical keyboard. It can also simulate a touch feel of an external physical keyboard to improve work efficiency and user experience of the foldable display device, compared to only using the virtual keyboard. When the keyboard film 13 is not in use, it can be housed on one side of the foldable body 11 away from the flexible display panel 12. It neither affects the full-screen display of the flexible display panel 12 nor the folding or unfolding of the foldable body. In addition, compared with using an external physical keyboard, the portability of the foldable display device with a keyboard film is improved.

Specifically, each key 131 of the keyboard film 13 has a hollow structure. When any one of the keys 131 is pressed, the protruding part of the key 131 is sunken and contacts an upper surface of the flexible display panel 12. When the pressing of the key 131 is released, the sunken part of the key 131 pops up and returns to its original shape, thereby the simulation of an external physical keyboard is realized.

Further, the flexible display panel 12 provided by an embodiment of the disclosure is a flexible display panel with a capacitive touch structure, and an inner surface of each key 131 is provided with a transparent conductive film. When any of the keys 131 is pressed, the metal conductive film on its inner surface contacts an upper surface of the flexible display panel 12, and capacitance is formed between the metal conductive film and the touch sensing electrode inside the flexible display panel 12 and a corresponding touch signal is generated. Therefore, the touch sensitivity of the keyboard film 13 can be effectively improved, and the situation that the touch sensing electrode cannot form a capacitance with the finger due to a greater thickness of the keyboard film 13, which may cause touch function failure, can be prevented.

Specifically, in the embodiment of the disclosure, the material of the keyboard film 13 is transparent thermoplastic polyurethane elastomer rubber (TPU), which provides the keyboard film 13 with good deformation recovery performance and improves a feel of touch the keyboard as well as a user experience of the keyboard film 13. Certainly, in some embodiments, the material of the keyboard film 13 can also be other transparent elastic rubber materials or transparent elastic silicone materials, both of them can achieve the same technical effects as the above embodiments. The specific materials can be selected according to actual needs, and there is no restriction herein.

Figure 4:
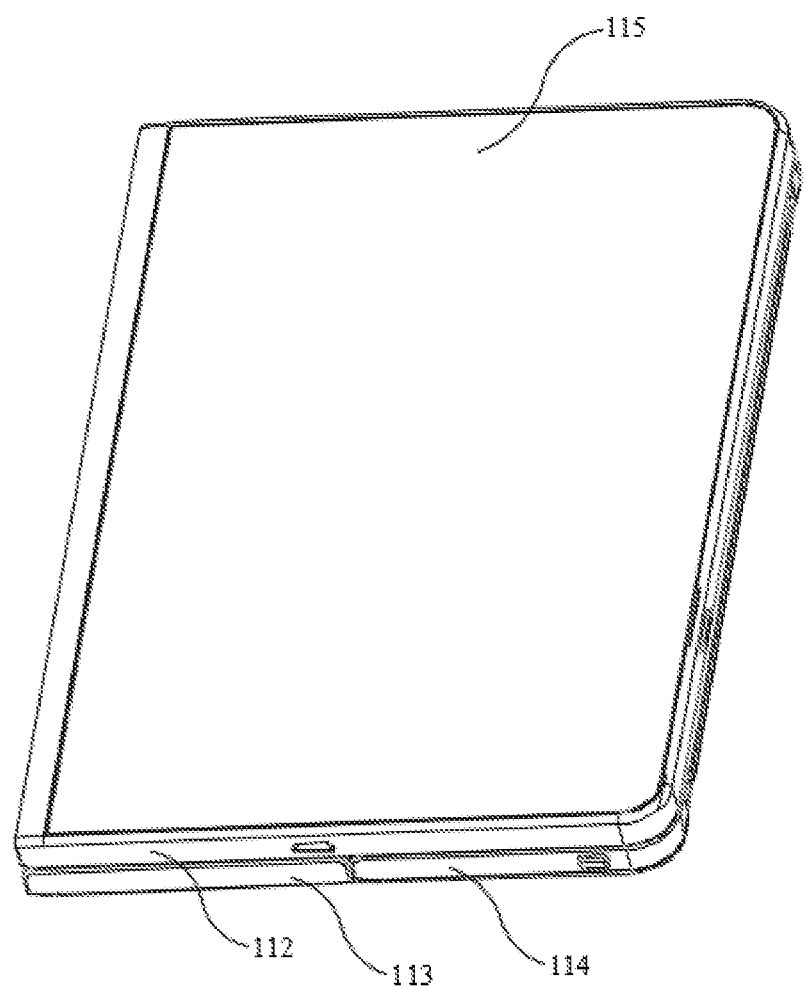
FIG. 4 is a schematic diagram of the front structure of the foldable display device in a folded state according to an embodiment of the disclosure.
Figure 5:
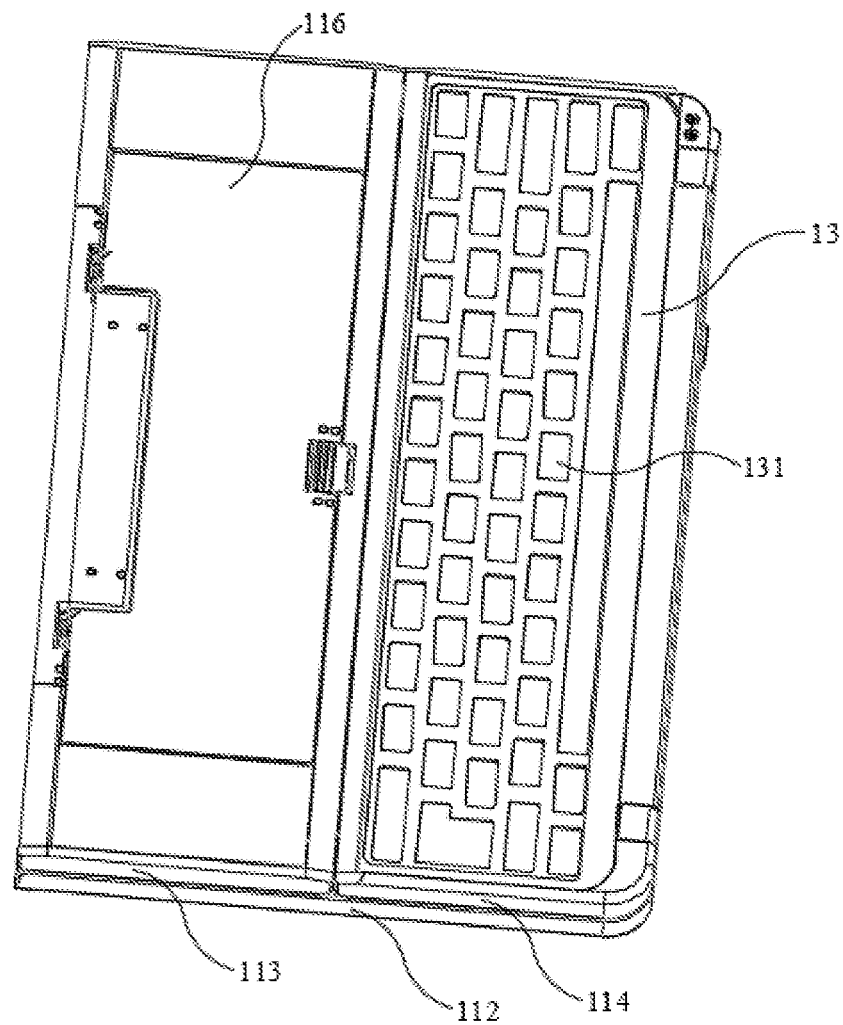
FIG. 5 is a schematic diagram of the rear structure of the foldable display device in the folded state provided by an embodiment of the disclosure.
Figure 6:
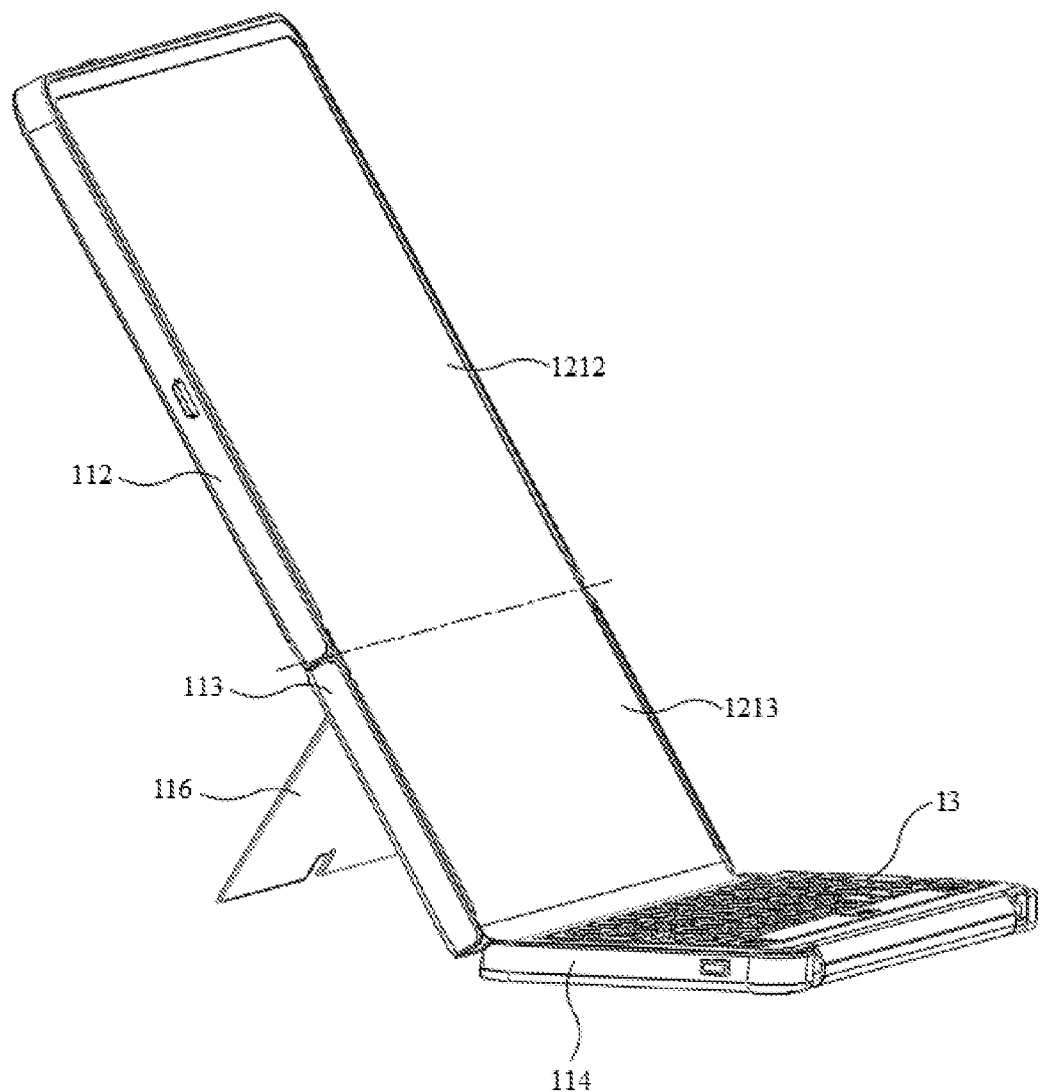
FIG. 6 is a schematic diagram of the front structure of the foldable display device in a half-folded state provided by an embodiment of the disclosure.
Figure 7:
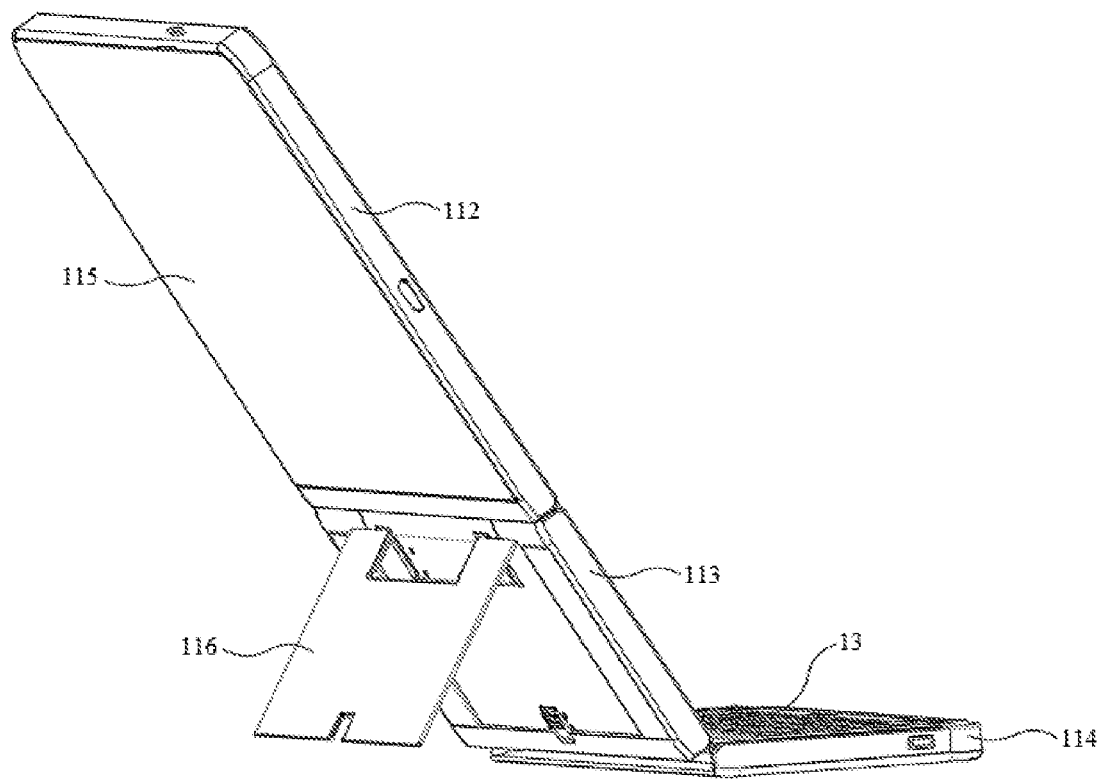
FIG. 7 is a schematic diagram of the rear structure of the foldable display device in the half-folded state provided by an embodiment of the disclosure.

Specifically, refer to FIG. 1 to FIG. 7, wherein FIG. 4 is a schematic diagram of the front structure of the foldable display device in the folded state provided by an embodiment of the disclosure. FIG. 5 is a schematic diagram of the rear structure of the foldable display device in the folded state provided by an embodiment of the disclosure. FIG. 6 is a schematic diagram of the front structure of the foldable display device in the half-folded state provided by an embodiment of the disclosure. FIG. 7 is a schematic diagram of the rear structure of the foldable display device in the half-folded state provided by an embodiment of the disclosure.

The display area 121 further includes a first display area 1212 and a second display area 1213, and the second display area 1213 is positioned between the first display area 1212 and the virtual keyboard area 1211. The foldable body 11 includes: a back panel 115, a first hinge 110, and a second hinge 111; a first body 112, a second body 113, and a third body 114 respectively corresponding to the first display area 1212, the second display area 1213, and the virtual keyboard area 1211. The back panel 115 is disposed on the side of the first body 112 away from the flexible display panel 12, the first body 112 and the second body 113 are connected by the first hinge 110, and the second body 113 and the third body 114 are connected by the second hinge 111. The foldable display device can be folded or unfolded by the first hinge 110 to enable the foldable display device in the unfolded state shown in FIG. 2 or in the folded state shown in FIG. 4. Also, the foldable display device can also be folded or unfolded by the second hinge 111 to enable the foldable display device in the half-folded state as shown in FIG. 6.

Further, referring to FIG. 5, the keyboard film 13 is connected to the side of the third body 114 away from the second body 113. A side of the third body 114 away from the flexible display panel 12 is provided with an accommodating cavity 1141, and the keyboard film 13 can be housed in the accommodating cavity 1141 when not in use.

In the disclosed embodiment, the keyboard film 13 and the third body 114 are fixedly connected to one side of the third body 114 away from the second body 113 by double-sided tape. The keyboard film 13 and the side of the third body 114 away from the second body 113 are fixedly connected by a double-sided tape. The keyboard film 13 can be flipped with respect to a fixed-connecting side. In some other embodiments, the keyboard film 13 can also be rotatably connected to a side of the third body 114 away from the second body 113 through a rotating shaft. The keyboard film 13 can be flipped by the rotating shaft.

Specifically, the foldable display device has two work modes: a notebook mode and a tablet mode. When the foldable display device is in the tablet mode, the foldable display device is in the unfolded state as shown in FIG. 2 and FIG. 3, the first display area 1212, the second display area 1213, and the virtual keyboard area 1211 are positioned in same plane to enable a coplanar display. The first body 112, the second body 113, and the third body 114 are also positioned in same plane through an action of the first hinge 110 and the second hinge 111. The keyboard film 13 is housed in the accommodating cavity 1141 on the side of the third body 114 away from the flexible display panel 12, which does not affect a normal use of the foldable display device in the tablet mode. Certainly, in the tablet mode, if the keyboard film 13 needs to be used, it can also be flipped to the side of the flexible display panel 12 away from the foldable body 11 and match the virtual keyboard area 1211. Thus, the keyboard film 13 is used by cooperating with the virtual keyboard displayed in the virtual keyboard area 1211.

When the foldable display device is in the notebook mode, the foldable display device is in the half-folded state as shown in FIG. 6 and FIG. 7. The first display area 1212 and the second display area 1213 are positioned in same plane under the support of the first body 112, the second body 113, and the first hinge 110, and they stand on a plane where the third body 114 is positioned by the second hinge 111 to perform display, and the virtual keyboard area 1211 displays the virtual keyboard. In the notebook mode, an included angle between a plane of the first body 112 and the second body 113 and that of the third body 114 is between 0 and 180 degrees. The included angle can be adjusted and fixed by the second hinge 111 so that the foldable display device in the notebook mode can be used in a variety of included angles. The keyboard film 13 is flipped to the side of the flexible display panel 12 away from the foldable body 11 to match the virtual keyboard area 1211, so as to use the foldable display device by cooperating with the virtual keyboard displayed in the virtual keyboard area 1211. Compared with just using a virtual keyboard, it can not only use the keyboard film to simulate a feel of an external physical keyboard, but also effectively improve work efficiency of the foldable display device in the notebook mode. Certainly, in the notebook mode, if the keyboard film 13 is not needed, it can also be housed in the accommodating cavity 1141 of the third body 114, without affecting stand and a use of the foldable display device.

Further, a whole body formed by the second display area 1213 and the virtual keyboard area 1211 is symmetrical to the first display area 1212 with respect to the first hinge 110. When the foldable display device is folded to the folded state through the first hinge 110, as shown in FIG. 4 and FIG. 5, the first display area 1212, the second display area 1213, and the virtual keyboard area 1211 are relatively inwardly folded, and their edges overlap each other. The second body 113, the third body 114, and the first body 112 are positioned outside the flexible display panel 12, they are also relatively inwardly folded and their edges overlap each other. At this time, the foldable display device can be folded into its smallest form, so it is convenient to carry.

Furthermore, the second display area 1213 and the virtual keyboard area 1211 are symmetrical with respect to the second hinge 111. When in the notebook mode, the foldable display device is in the half-folded state. The virtual keyboard area 1211 configured to display the virtual keyboard only occupies a quarter of the display area 121 of the flexible display panel 12, and the first display area 1212 and the second display area 1213 for screen display occupy three-quarters of the display area 121. Compared with current foldable display device which is folded inward, it can effectively increase an area of the display area for screen display in notebook mode, so as to improve user experience of the foldable display device in notebook mode and improve work efficiency of the foldable display device.

Further, referring to FIG. 6 and FIG. 7, a bracket 116 is disposed on the side of the second body 113 away from the flexible display panel 12. When in the notebook mode, the bracket 116 is unfolded. One end of the bracket 116 abuts against the plane where the third body 114 is positioned, and the other end of the bracket 116 abuts against the back of the second body 113 to support the first body 112 and the second body 113 to keep them at a fixed angle and prevent them from tipping over due to a high center of gravity. A side of the second body 113 away from the flexible display panel 12 is also provided with an accommodating cavity. When in the tablet mode or in the folded state, the bracket 116 can be housed in the accommodating cavity of the second body 113 without affecting the folding or unfolding of the foldable display device. Therefore, the stability of the foldable display device in the notebook mode can be improved, and the portability of the foldable display device can also be improved.

Certainly, the bracket 116 is not limited to be disposed on the side of the second body 113 away from the flexible display panel 12. In some embodiments, the bracket 116 can also be disposed on the side of the first body 112 away from the flexible display panel 12, so that the same supporting effect as the above embodiments can also be obtained. In other embodiments, an external independent bracket can also be used to replace the bracket 116 disposed on the side of the second body away from the flexible display panel, which can also achieve the same supporting effect as the foregoing embodiment. The specific structure can be set according to actual requirements, and there is no limitation herein.

Figure 8:
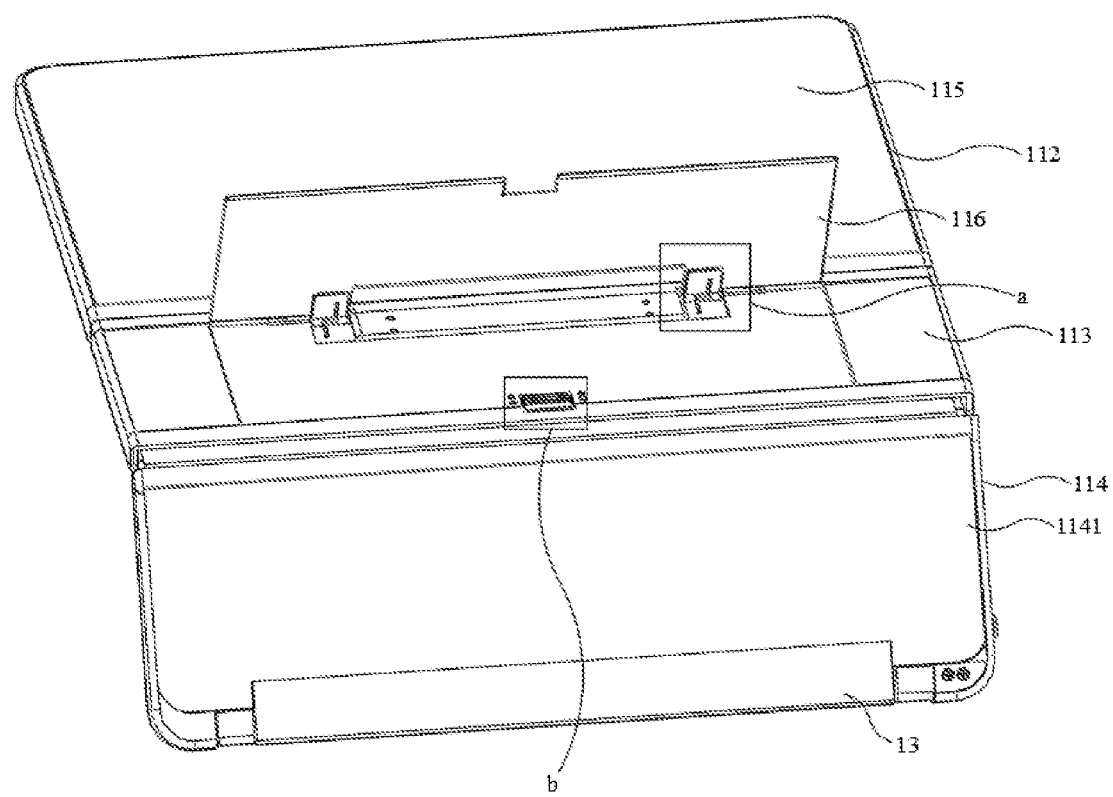
FIG. 8 is a schematic diagram of a bottom structure of the foldable display device in the half-folded state provided by an embodiment of the disclosure.
Figure 9:
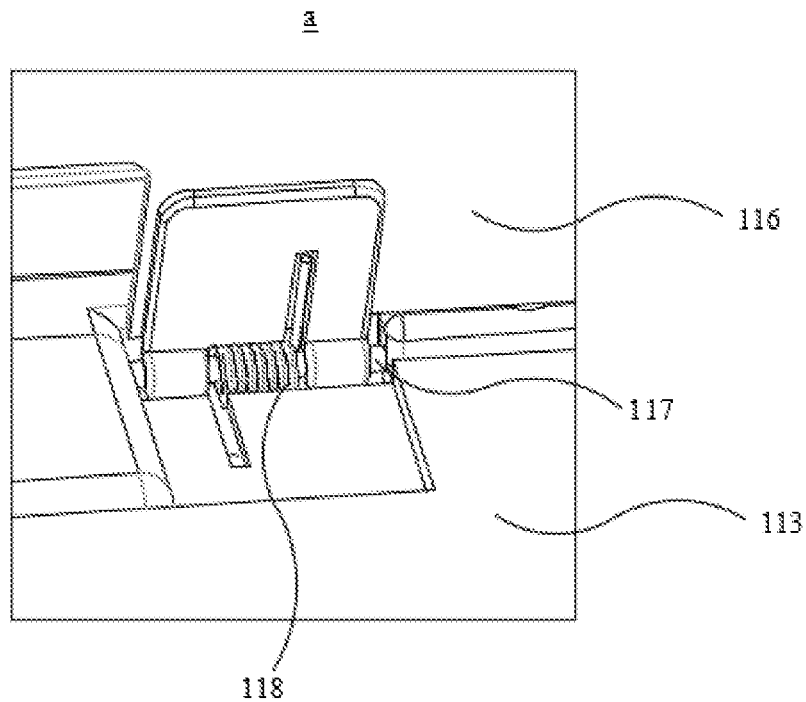
FIG. 9 is an enlarged schematic diagram of part a in FIG. 8.
Figure 10:
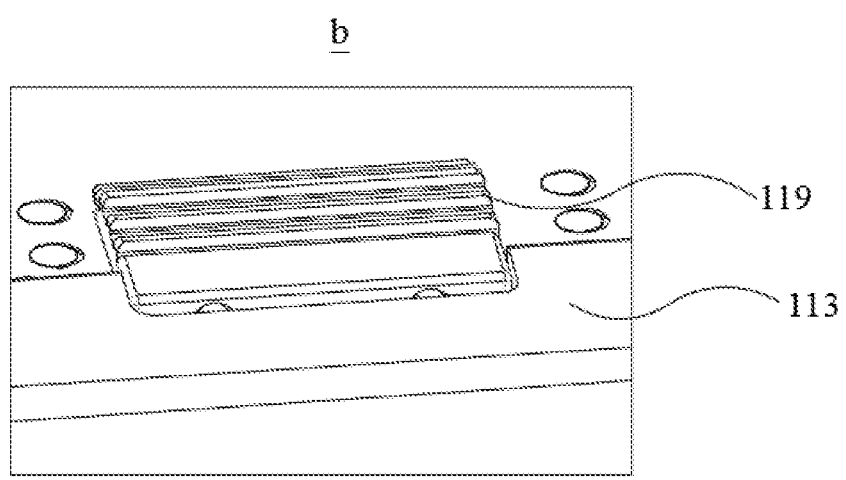
FIG. 10 is an enlarged schematic diagram of part b in FIG. 8.

Further, referring to FIG. 8 to FIG. 10. FIG. 8 is a schematic diagram of a bottom structure of the foldable display device in the half-folded state provided by an embodiment of the disclosure. FIG. 9 is an enlarged schematic diagram of part a in FIG. 8, and FIG. 10 is an enlarged schematic diagram of part b in FIG. 8. Both ends of the bracket 116 are provided with shaft holes, and the bracket 116 is rotatably connected to the side of the second body 113 close to the first body 112 through a rotating shaft 117. A torsion spring 118 is disposed on the rotating shaft 117, and the torsion arms on both sides of the torsion spring 118 are respectively fixed to the bracket 116 and the second body 112.

A side of the second body 113 close to the third body 114 is provided with a sliding buckle 119, the base of the sliding buckle 119 is fixed to the second body 113 by bolts, and the sliding buckle fixes and releases the bracket 116.

In the notebook mode, when the sliding buckle 119 is toggled, the bracket 116 can be ejected under an action of the torsion spring 118 to support the foldable display device. In the tablet mode or in the folded state, the bracket 116 is housed in the accommodating cavity on the side of the second body 113 away from the flexible display panel 12 and fixed by the sliding buckle 119 to prevent the bracket 116 from popping out.

In the embodiments of the disclosure, the foldable display device should also include components such as a processor, a driving chip, and a power supply assembly, etc. The processor, the driving chip, the power supply assembly, and other components can be disposed in the first body 112, the second body 113 or the third body 114. The components located in different bodies can be connected through a flexible printed circuit board, and the flexible display panel 12 is also connected to the above-mentioned components through the flexible printed circuit board.

Beneficial effects are: In the disclosed embodiment, a keyboard film is connected to one side of the foldable body and is provided with raised keys, each corresponding to a key position of the virtual keyboard in one-to-one correspondence. The keyboard film can be housed on one side of the foldable body away from the flexible display panel when not in use, so it does not affect the normal use of the foldable display device in the tablet mode. When in use, the keyboard film can be flipped to the side of the flexible display panel away from the foldable body to match the virtual keyboard area of the flexible display panel to realize a function of simulating a feel of an external physical keyboard. Therefore, work efficiency of the foldable display device in the notebook mode and the portability of the foldable display device are improved.

Although the disclosure is disclosed by preferred embodiments above, the preferred embodiments are not intended to limit the disclosure. Those of ordinary skill in the art can make various changes and modifications without departing from the spirit and scope of the disclosure. Therefore, the protection scope of this disclosure is based on the scope defined by the claims.

What is claimed is:

1. A foldable display device with a notebook mode and a tablet mode, the foldable display device comprising:
    a foldable body enabling the foldable display device to be in a folded state, a half-folded state, and an unfolded state;
    a flexible display panel disposed on the foldable body and comprising a display area, the display area comprising a virtual keyboard area configured to display a virtual keyboard; and
    a keyboard film connected to one end of the foldable body, the keyboard film provided with a plurality of raised keys corresponding to key positions of the virtual keyboard in one-to-one correspondence, wherein the keyboard film is housed on one side of the foldable body away from the flexible display panel when not in use, and the keyboard film is flipped to one side of the flexible display panel away from the foldable body when in use to match the virtual keyboard area to realize a function of simulating a feel of an external physical keyboard.

2. The foldable display device according to claim 1, wherein each of the keys is a hollow structure, an inner surface of each of the keys is provided with a transparent conductive film, and when the keys are pressed and thus recessed, the transparent conductive film therein contacts a surface of the flexible display panel.

3. The foldable display device according to claim 2, wherein material of the keyboard film comprises transparent elastic rubber or transparent elastic silicone.

4. The foldable display device according to claim 1, wherein the display area further comprises a first display area and a second display area, the second display area is positioned between the first display area and the virtual keyboard area, the foldable body comprises a first hinge, a second hinge, and a first body, a second body, and a third body respectively corresponding to the first display area, the second display area, and the virtual keyboard area, the first body and the second body are connected by the first hinge, and the second body and the third body are connected by the second hinge.

5. The foldable display device according to claim 4, wherein the keyboard film is fixedly connected or rotatably connected to one side of the third body away from the second body, one side of the third body away from the flexible display panel is provided with an accommodating cavity, and the keyboard film is housed in the accommodating cavity when not in use.

6. The foldable display device according to claim 5, wherein when the foldable display device is in the tablet mode, the foldable display device is in the unfolded state, and the first display area, the second display area, and the virtual keyboard area are positioned in a same plane to enable a coplanar display.

7. The foldable display device according to claim 6, wherein when the foldable display device is in the notebook mode, the foldable display device is in the half-folded state, the first display area and the second display area are positioned in a same plane and stand on a plane where the third body is positioned through the second hinge to enable the coplanar display, and the virtual keyboard area is configured to display the virtual keyboard while the keyboard film is flipped to the one side of the flexible display panel away from the foldable body to match the virtual keyboard area.

8. The foldable display device according to claim 7, wherein a whole body formed by the second display area and the virtual keyboard area is symmetrical to the first display area with respect to the first hinge, and the second display area and the virtual keyboard area are symmetrical with respect to the second hinge.

9. The foldable display device according to claim 7, wherein a bracket is disposed on one side of the second body away from the flexible display panel, when the foldable display device is in the notebook mode, the bracket is unfolded and abuts against the plane where the third body is positioned, and when the foldable display device is in the tablet mode, the bracket is housed on the one side of the second body away from the flexible display panel.

10. The foldable display device according to claim 9, wherein the bracket is rotatably connected to one side of the second body close to the first body through a rotating shaft, a torsion spring is disposed on the rotating shaft, torsion arms on both sides of the torsion spring are respectively fixed on the bracket and the second body, and one side of the second body close to the third body is provided with a sliding buckle configured to fix the bracket.

11. A foldable display device with a notebook mode and a tablet mode, the foldable display device comprising:
a foldable body enabling the foldable display device to be in a folded state, a half-folded state, and an unfolded state;
a flexible display panel disposed on the foldable body and comprising a display area, the display area comprising a virtual keyboard area configured to display a virtual keyboard; and
a keyboard film connected to one end of the foldable body, wherein material of the keyboard film is a transparent elastic rubber, the keyboard film is provided with a plurality of raised keys corresponding to key positions of the virtual keyboard in one-to-one correspondence, each of the keys is a hollow structure, an inner surface of each of the keys is provided with a transparent conductive film, the keyboard film is housed on one side of the foldable body away from the flexible display panel when not in use, the keyboard film is flipped to one side of the flexible display panel away from the foldable body when in use and match the virtual keyboard area, and when the keys are pressed and thus recessed, the transparent conductive film therein contacts a surface of the flexible display panel to realize a function of simulating a feel of an external physical keyboard.

12. The foldable display device according to claim 11, wherein the display area further comprises a first display area and a second display area, the second display area is positioned between the first display area and the virtual keyboard area, the foldable body comprises a first hinge, a second hinge, and a first body, a second body, and a third body respectively corresponding to the first display area, the second display area, and the virtual keyboard area, the first body and the second body are connected by the first hinge, and the second body and the third body are connected by the second hinge.

13. The foldable display device according to claim 12, wherein the keyboard film is fixedly connected or rotatably connected to one side of the third body away from the second body, one side of the third body away from the flexible display panel is provided with an accommodating cavity, and the keyboard film is housed in the accommodating cavity when not in use.

14. The foldable display device according to claim 13, wherein when the foldable display device is in the tablet mode, the foldable body is in the unfolded state, and the first display area, the second display area, and the virtual keyboard area are positioned in a same plane to enable a coplanar display.

15. The foldable display device according to claim 14, wherein when the foldable display device is in the notebook mode, the foldable display device is in the half-folded state, the first display area and the second display area are positioned in a same plane and stand on a plane where the third body is positioned through the second hinge to enable the coplanar display, and the virtual keyboard area is configured to display the virtual keyboard while the keyboard film is flipped to the one side of the flexible display panel away from the foldable body to match the virtual keyboard area.

16. The foldable display device according to claim 15, wherein a whole body formed by the second display area and the virtual keyboard area is symmetrical to the first display area with respect to the first hinge, and the second display area and the virtual keyboard area are symmetrical with respect to the second hinge.

17. The foldable display device according to claim 15, wherein a bracket is disposed on one side of the second body away from the flexible display panel, when the foldable display device is in the notebook mode, the bracket is unfolded and abuts against the plane where the third body is positioned, and when the foldable display device is in the tablet mode, the bracket is housed on the one side of the second body away from the flexible display panel.

18. The foldable display device according to claim 17, wherein the bracket is rotatably connected to one side of the second body close to the first body through a rotating shaft, a torsion spring is disposed on the rotating shaft, torsion arms on both sides of the torsion spring are respectively fixed on the bracket and the second body, and one side of the second body close to the third body is provided with a sliding buckle configured to fix the bracket.

19. A foldable display device with a notebook mode and a tablet mode, the foldable display device comprising:
a foldable body enabling the foldable display device to be in a folded state, a half-folded state, and an unfolded state, the foldable body comprising a first hinge, a second hinge, a first body, a second body, and a third body, wherein the first body and the second body are connected by the first hinge, and the second body and the third body are connected by the second hinge;
a flexible display panel disposed on the foldable body and comprising a first display area, a second display area, and a virtual keyboard area configured to display a virtual keyboard, wherein the second display area is positioned between the first display area and the virtual keyboard area; and
a keyboard film connected to one side of the third body away from the second body, wherein the keyboard film is made of transparent elastic rubber material, and the keyboard film is provided with a plurality of raised keys corresponding to key positions of the virtual keyboard in one-to-one correspondence;
wherein each of the keys is a hollow structure, an inner surface of each of the keys is provided with a transparent conductive film, the keyboard film is housed on one side of the foldable body away from the flexible display panel when not in use, the keyboard film is flipped to one side of the flexible display panel away from the foldable body when in use to match the virtual keyboard area, and when the keys are pressed and thus recessed, the transparent conductive film therein contacts a surface of the flexible display panel to realize a function of simulating a feel of an external physical keyboard.

20. The foldable display device according to claim 19, wherein a whole body formed by the second display area and the virtual keyboard area is symmetrical to the first display area with respect to the first hinge, and the second display area and the virtual keyboard area are symmetrical with respect to the second hinge.

* * * * *